United States Patent
Vestavik

(10) Patent No.: US 12,385,672 B2
(45) Date of Patent: Aug. 12, 2025

(54) METHOD AND APPARATUS TO ESTABLISH A GEOTHERMAL WELL FOR CLOSED LOOP FLUID CIRCULATION AND GEOTHERMAL HEAT EXTRACTION

(71) Applicant: Reelwell AS, Sola (NO)

(72) Inventor: Ola M. Vestavik, Fosnavåg (NO)

(73) Assignee: Reelwell AS, Sola (NO)

( * ) Notice: Subject to any disclaimer, the term of this patent is extended or adjusted under 35 U.S.C. 154(b) by 0 days.

(21) Appl. No.: 18/440,231

(22) Filed: Feb. 13, 2024

(65) Prior Publication Data

US 2024/0318872 A1    Sep. 26, 2024

Related U.S. Application Data

(63) Continuation of application No. PCT/IB2022/057563, filed on Aug. 12, 2022.

(60) Provisional application No. 63/232,693, filed on Aug. 13, 2021.

(51) Int. Cl.
*F24T 10/10* (2018.01)
*E21B 21/00* (2006.01)
*F24T 10/00* (2018.01)

(52) U.S. Cl.
CPC .............. *F24T 10/10* (2018.05); *E21B 21/00* (2013.01); *F24T 2010/53* (2018.05)

(58) Field of Classification Search
CPC ........ F24T 10/10; F24T 2010/53; E21B 21/00
See application file for complete search history.

(56) References Cited

U.S. PATENT DOCUMENTS

| | | | |
|---|---|---|---|
| 5,370,182 | A | 12/1994 | Hickerson |
| 5,862,866 | A | 1/1999 | Springer |
| 2003/0221870 | A1 | 12/2003 | Johnson |
| 2014/0083776 | A1 | 3/2014 | Hoegset et al. |
| 2021/0164708 | A1* | 6/2021 | Niemi ..................... F24T 10/17 |

(Continued)

FOREIGN PATENT DOCUMENTS

| | | |
|---|---|---|
| CN | 110924865 A | 3/2020 |
| GB | 2549832 A | 11/2017 |

OTHER PUBLICATIONS

First Office Action, Eurasian Patent Application No. 202490436 issued May 8, 2024, with English translation.

(Continued)

*Primary Examiner* — Aaron L Lembo
(74) *Attorney, Agent, or Firm* — Richard A. Fagin

(57) ABSTRACT

A method to establish a well using a nested drill/completion string. The nested drill/completion string includes an inner pipe nested in an outer pipe, a flow crossover disposed at an end of the nested drill string and a drill bit disposed to one side of the flow crossover. Drilling fluid is pumped into the well through a first annular space between the inner pipe and the outer pipe, and drill cuttings created by the drill bit are returned to surface through in inner pipe. For the completion of the well, either (i) fluid in the annular space is displaced with a lower conductivity fluid or (ii) the annular space; is evacuated. Fluid to be heated is pumped through a second annular space between the well and the exterior of the nested drill string and geothermally heated fluid is moved from the subsurface to the surface through the inner pipe.

16 Claims, 2 Drawing Sheets

(56) References Cited

U.S. PATENT DOCUMENTS

2021/0164748 A1   6/2021  Niemi

OTHER PUBLICATIONS

International Preliminary Report Concerning Patentability, International Application No. PCT/IB2022/057563 issued Nov. 6, 2023.
International Search Report and Written Opinion, International Application No. PCT/IB2022/057563 issued Dec. 22, 2022.
Written Opinion of the International Preliminary Examining Authority (Rule 66), International Application No. PCT/IB2022/057563 issued Sept. 1, 2023.

* cited by examiner

METHOD AND APPARATUS TO ESTABLISH A GEOTHERMAL WELL FOR CLOSED LOOP FLUID CIRCULATION AND GEOTHERMAL HEAT EXTRACTION

CROSS REFERENCE TO RELATED APPLICATIONS

Continuation of International Application No. PCT/IB2022/057563 filed on Aug. 12, 2022. Priority is claimed from U.S. Provisional Application No. 63/232,693 filed on Aug. 13, 2021. The foregoing applications each is incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of producing energy from heat contained in formations below the Earth's surface. More particularly, the disclosure relates to methods and apparatus for constructing wells to penetrate subsurface formations for production of thermal energy contained in such formations.

Wellbores are known to be drilled through subsurface Earth formations for the purpose of extracting energy in the form of heat in such formations. Heat may be extracted by pumping cool fluid (e.g., liquid) from the surface into a well that penetrates a permeable formation, and withdrawing to surface the fluid after it has been heated by the surrounding permeable formation.

FIG. 1 shows a well-known solution to for geothermal energy production, i.e., to drill and complete two substantially vertical wells P, I into such a formation F. The wells P, I are spaced apart a lateral distance L from each other. Fluid, e.g., water, is pumped down through one of the wells, termed the injector well I, and heated fluid is produced from the formation F from the other well, termed the producing well P. The fluid is heated by the rock at depth when flowing through the formation F between the wells P, I. There are several challenges with such conventional solution for geothermal heat extraction:

1. The fluid may dissolve and absorb minerals from the formation F that often cause problems of scaling and corrosion, which may increase well maintenance and pumping costs.
2. There is considerable thermal energy loss in the producer well P.
3. In order to provide sufficient permeability to the formation F in some cases, it may be necessary to fracture treat the formation F, which can increase the risk of groundwater pollution, seismicity and environmental degradation.
4. The circulation fluid is generally limited to use of water.
5. Conventional drilling and completion of the wells P, I with fluid return in the well annulus may cause a hot wellhead, and can cause soil instabilities near the wellhead, especially in arctic areas (i.e., risk to damage of permafrost).

A known solution to reduce the foregoing problems using spaced apart vertical wells is to drill and complete a highly inclined or horizontal well section connecting the two wells at depth and thereby construct a closed circulation loop, but this represents a directional drilling challenge.

FIG. 2 shows an alternative closed circulation loop solution, e.g., to install a thermally insulated completion tubing string T in a long-reach horizontal well or "nested conduit well" NCW. A casing C may be used to line the drilled portion of the well, and an insulated tubing T may be nested within the casing C to transported heated fluid to the surface. The geothermal heat is in this case extracted from the formation F in the horizontal well section. The construction of such a well NCW is considered challenging, since the drilling reach of the horizontal portion of the well can be subjected to significant Non Productive Time (NPT) related to fluid loss, hole cleaning, high torque, drag and equivalent circulating density (ECD). The cost efficiency of the solution shown in FIG. 2 may be limited by the reach of the horizontal section and by the expected NPT for drilling and completion of the well NCW. In constructing a well NCW as shown in FIG. 2, it is known in the art to drill the well using conventional drill pipe and drilling tools, and to later insert the casing C after the drilling tools are withdrawn. In addition to the other risks associated with construction of a long-reach horizontal well, there is risk that the casing C cannot be inserted to the intended depth because of inability to fully clean the drilled well and/or partial collapse of the well or existence of ledges along the well.

There is a need for improved methods and apparatus for construction of geothermal wells.

SUMMARY

One aspect of the present disclosure is a method for drilling a well and producing fluid from the well. A method according to this aspect includes drilling the well using a nested drill string. The nested drill string includes an inner pipe nested in an outer pipe, a flow crossover disposed at an end of the nested drill string and a drill bit disposed to one side of the flow crossover. Drilling fluid is pumped into the well through an annular space between the inner pipe and the outer pipe, and drill cuttings created by the drill bit are returned to surface through in inner pipe. Either (i) fluid in the annular space is displaced with a lower conductivity fluid/gas and/or; (ii) the annular space is evacuated, and fluid to be heated is moved from surface through an annular space between the outer pipe and the well, and after heating is moved to the surface through the inner pipe.

Some embodiments further comprise filling the annular space between the well and an exterior of the nested drill string with a fluid having a higher density than the drilling fluid.

In some embodiments, at least part of the well is substantially horizontal.

A method for drilling and completion of a well and extracting geothermal energy from the well according to another aspect of this disclosure includes drilling the well at least partially using a nested drill string. The nested drill string includes an inner pipe nested in an outer pipe, a flow crossover disposed at an end of the nested drill string and a drill bit disposed to one side of the flow crossover. Drilling fluid is pumped into the well through a first annular space between the inner pipe and the outer pipe, and drill cuttings created by the drill bit are returned to surface through the inner pipe. The nested drill string is removed from the well. A nested pipe string is inserted into the well. The nested pipe string comprises an inner pipe nested within an outer pipe to provide a first annular space therebetween and a second annular space between the outer pipe and the well. The method includes either (i) placing a low thermal conductivity fluid in the first annular space of (ii) evacuating the first annular space; and geothermally heating fluid by pumping fluid into the well through the second annular space and returning the pumped fluid through an interior of the inner pipe.

In some embodiments, at least part of the well is substantially horizontal.

Another aspect of the disclosure is a method for producing geothermal energy from a pre-drilled well. A nested pipe string is inserted into the well. The nested pipe string comprises an inner pipe nested within an outer pipe to provide a first annular space therebetween and a second annular space between the outer pipe and the well. The method includes either (i) placing a low thermal conductivity fluid in the first annular space of (ii) evacuating the first annular space; and geothermally heating fluid by pumping fluid into the well through the second annular space and returning the pumped fluid through an interior of the inner pipe. The first annular space is substantially continuous over the length of the nested pipe string.

In some embodiments, at least part of the well is substantially horizontal.

In some embodiments, the nested pipe string comprises at least one of a thermal radiation barrier, a thermal convection barrier and a thermal conduction barrier in the first annular space.

Some embodiments further comprise installing a permeability barrier in an uncased part of the well.

In some embodiments, the permeability barrier comprises at least one of a casing, a chemical coating and a particle coating.

In some embodiments, the outer pipe and the inner pipe are inserted into the well simultaneously.

In some embodiments, the well is drilled using the nested pipe string.

In some embodiments, at least one of the inner pipe and the outer pipe comprises segments coupled end to end.

In some embodiments, the first annular space is substantially hydraulically continuous along the entire length of the nested pipe string.

Other aspects and possible advantages will be apparent from the description and claims that follow.

DETAILED DESCRIPTION

Reelwell AS, Sola, Norway, has developed a well drilling method based on a nested conduit ("dual channel") drill string that alleviates certain challenges occurring in long-reach horizontal wells in relation to downhole torque, drag and formation pressure control. Such a well drilling method is described, for example, in U.S. Pat. No. 9,057,236 issued to Høgset et al. and assigned to Reelwell AS. A relevant part of the foregoing method is the use of Heavy Over Light (HOL) drilling fluids in specific portions of the well, i.e., to use a higher density fluid in the well annulus between the wellbore wall and the outside wall of a dual channel drill string (a nested pipe string), than the density of fluid inside the dual channel drill string (whether in an annular space between the nested pipe string or inside the inner pipe). The method disclosed in the '236 patent may allow a well to be drilled and completed beyond the attainable horizontal reach using conventional single conduit drill string techniques, and thus may enable construction of closed loop geothermal wells with improved cost efficiency.

Figure 2:
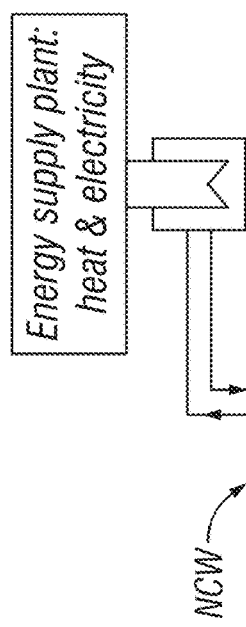
FIG. 2 shows a geothermal energy production apparatus known in the art using a horizontal well.
Figure 2:
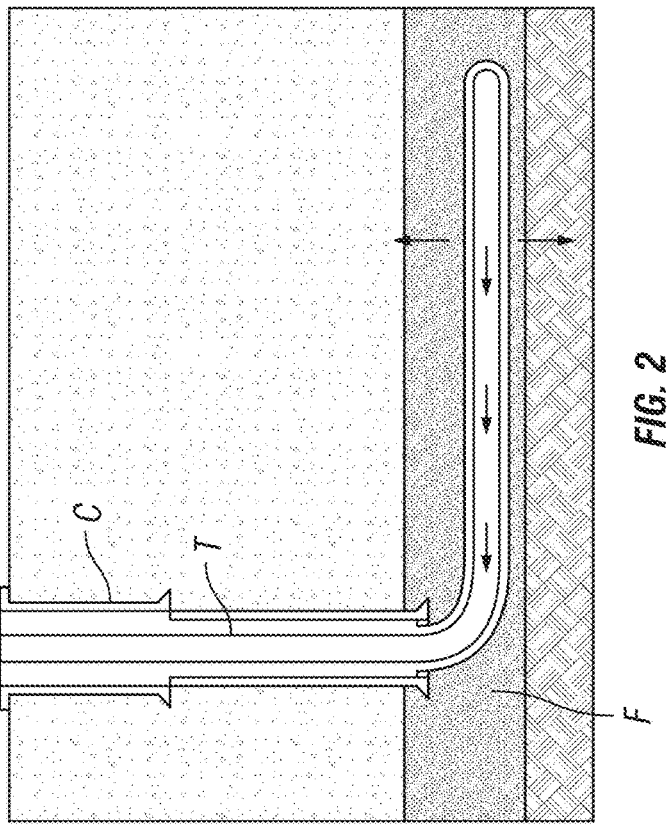
Figure 1:
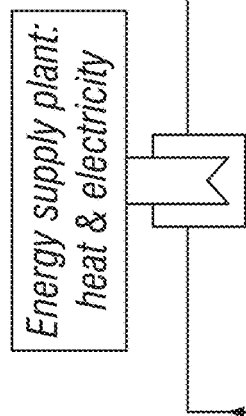
FIG. 1 shows a geothermal energy production apparatus known in the art using two laterally spaced apart vertical wells.
Figure 1:
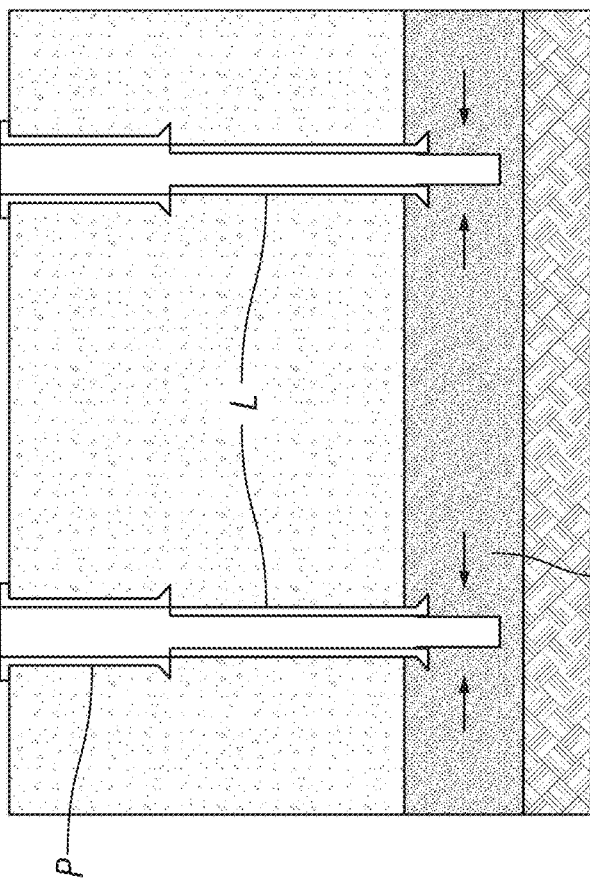

The dual channel drill string used to drill such a geothermal well may also provide for a way to convert the dual channel drill string to a thermally insulated completion conduit after the horizontal section of the well is finished drilling. To perform such string use conversion, fluid in the inner annulus of the dual channel drill string (i.e., the annular space between the inner nested conduit and the outer conduit in the dual channel drill string shown, for example, at 4 in FIG. 1 of the '239 patent) may be displaced with a liquid or gas having lower thermal conductivity than the drilling fluid otherwise present in such inner annular space, or to evacuate the inner annular space by sealing it off and evacuating it, for example, by use of a vacuum pump. The dual channel string can be run after the end of well drilling, to be used as a dedicated completion string, or the dual channel drill string, with design to avoid internal heat loss, may be directly converted to a thermally insulated completion pipe string after drilling the well using such dual channel drill string. In this way, the well can be drilled and completed to a long horizontal reach while minimizing risk of well collapse or failure to reach the intended depth when running a completion pipe after the drilling is finished. The above described arrangement and procedure can thereby enable geothermal wells to be drilled and completed more cost efficiently than for more conventional solutions.

Figure 3:
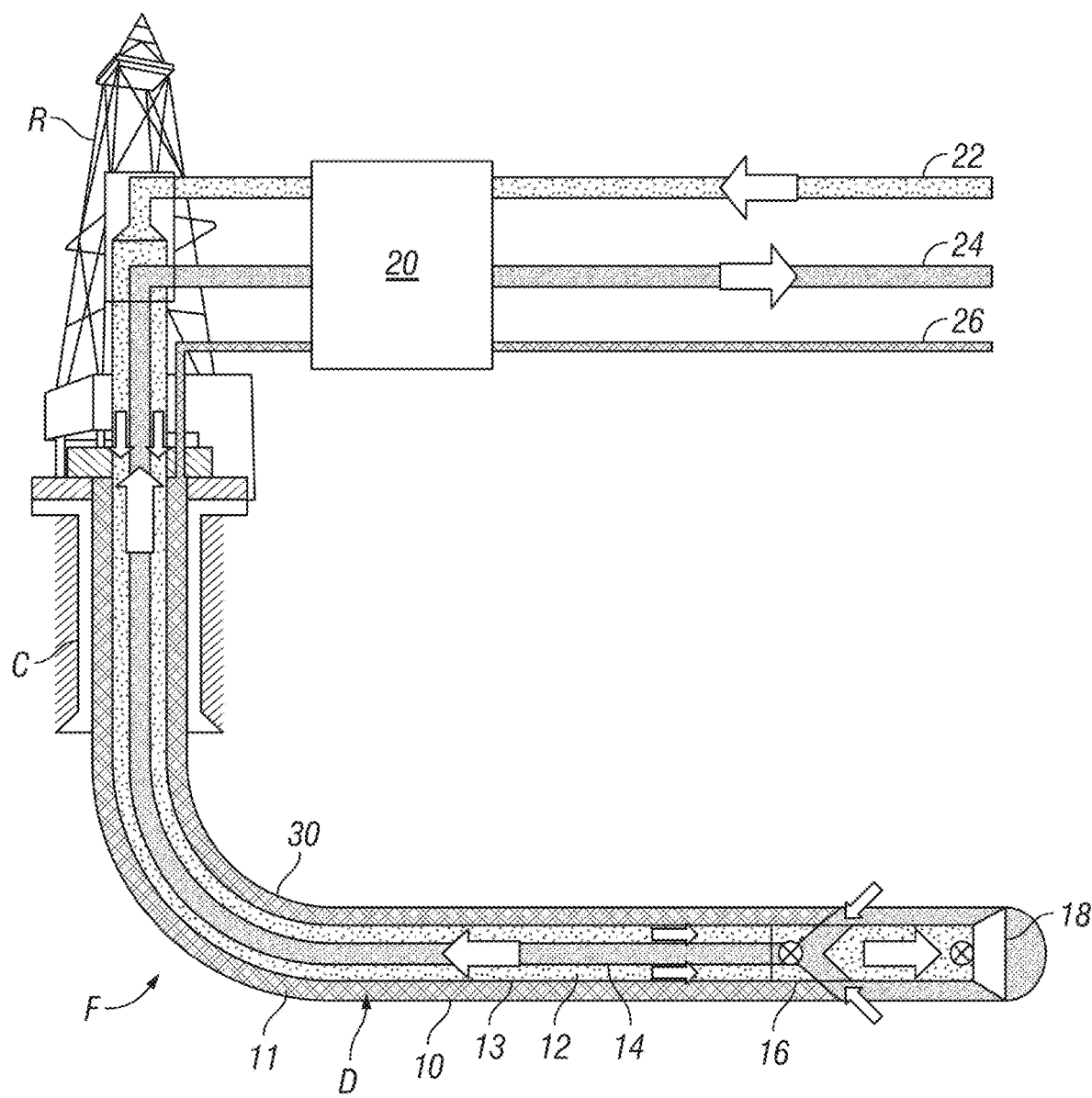
FIG. 3 shows a geothermal energy production system and method using a horizontal well drilled with a nested drill pipe drilling tool assembly.

FIG. 3 presents a schematic view of a highly inclined or horizontal well 10 drilled using a drilling rig R at the earth's surface. The highly inclined or horizontal well 10 may be drilled from a depth below a surface casing or intermediate casing C using a dual channel drill string D to rotate and axially urge a drill bit 18 at the bottom end of the dual channel drill string D. The dual channel drill string D comprises an inner pipe 14 nested inside an outer pipe 13. Drilling fluid ("mud") 22 may be pumped from the surface through an annular space ("annulus") 12 between the outer pipe 13 and the inner pipe 14 in the dual channel drill string D. The mud 22 is moved from the annulus 12 to the drill bit 18 through a flow crossover 16, wherein the mud 22 is ultimately discharged through the drill bit 18 to cool and lubricate the drill bit 18 and to lift drill cuttings from the well 10 to surface. The flow crossover 16 moves the cuttings and return mud flow into an interior of the inner pipe 14, which by its relatively small internal diameter will provide the cuttings laden return mud with relatively high velocity so that settling of cuttings and consequent "pack off" of the well 10 may be minimized or eliminated.

The fluid in the well annulus 11, i.e. the annular space outside of the dual drill string D (that is, externally to the outer pipe 13), within the wall of the well 10 and above the flow crossover 16/drill bit 18, may be pumped from surface at 26, and may have different density and fluid properties compared to the fluid, i.e., mud 22, inside the dual channel drill string D. The foregoing method allows eliminating or strongly reducing the ECD, and torque and drag, thereby allowing for horizontal reach of the well 10 beyond the capability of conventional drilling and completion.

After the well 10 is drilled, the well 10 may be completed by leaving in place the dual channel drill string D. As schematically shown in FIG. 3, the dual channel drill string D, or an equivalent nested dual pipe string, can be converted into a thermally insulated production string by closing the annulus 12 in the dual channel drill string D and either displacing the existing fluid in the annulus 12 with a low thermal conductivity fluid such as gas, or by evacuating the annulus 12. Fluid to be heated by subsurface formations through which the well 10 is drilled may be moved from the surface through the well annulus 11 as shown at 26. As such fluid is moved through the well annulus 11, it is heated by the rock formation F outside the well 10. Fluid thus heated by the rock formation F may be moved into the interior of the inner pipe 14 and flow to surface as indicated by the arrows in FIG. 3, while heat loss to the external environment, and more specifically to a wellhead at the surface, may be reduced because the inner pipe 14 is thermally insulated from the outer pipe 13 by the low thermal conductivity fluid (or vacuum) in the annulus 12.

After the well 10 is drilled to the desired depth, the formation surface of the "open hole" section of the well 10 (the part not having casing or liner) disposed below the bottom of the casing C, can be made impermeable to flow of fluid by installing a permeability barrier 30 on the wall of the exposed rock formation(s) F. The permeability barrier 30 may be installed, for example, by coating with particles or chemicals such as those used in creating a filter cake in exposed formations during well drilling, or combinations of such chemicals or particles. Such permeability barrier 30 may also improve the mechanical stability of the well 10. It is also within the scope of this disclosure to isolate the open hole part of the well 10 by inserting therein an additional casing or metal/composite membrane or "skin" to provide the above mentioned mechanical stability and permeability barrier, thus enabling efficient closed loop circulation. It will also be appreciated that the rock formation(s) F may be substantially impermeable to fluid flow while enabling transfer of heat to circulated fluid as explained above, thus obviating the need for any form of separate permeability barrier.

Although drilling and completing a well for geothermal energy production is not limited to such formations, it will be appreciated that a well that is drilled and completed as described herein may be drilled through rock formations having low or substantially no fluid permeability. According to the present disclosure, a well having only a single surface expression may be used to move fluid to be heated into the formation and return heated fluid to surface.

While not so limited to such embodiment, by using the same dual channel drill string D to drill, complete and extract geothermal heat from the formation F, risk to the well 10 between drilling and completion may be reduced, while at the same time reducing the time expended by the drilling rig R to get the well 10 into condition for geothermal energy production. It will be appreciated by those skilled in the art that after well drilling is ended, in some embodiments, the dual channel drill string D may be removed from the well 10 and a nested pipe string may be inserted into the well 10. The nested pipe string may comprise an inner pipe nested within an outer pipe, that is, it may be structurally similar to the dual channel drill string D, but may omit the flow crossover 16 and drill bit 18, having instead, flow controls (not shown) to enable displacement of fluid within the inner pipe and annular space and subsequent closing to flow of the annular space that is may serve as a thermal insulator in the manner explained above with reference to the dual channel drill string D. It is also within the scope of this disclosure to drill a well, including a well having a lateral extension such as a horizontal well, using a drilling system having conventional, single channel pipe. The described nested pipe string may be inserted into the well after drilling is ended as explained above for production of geothermal energy. It is also within the scope of the present disclosure to drill a well using conventional single channel pipe, and to complete such well using conventional casing or liner. Once such casing or liner is set in the well, an inner pipe It will also be appreciated that the described nested pipe string may be designed to minimize heat loss in the geothermally heated fluid returning to surface in the inner pipe. The nested pipe string may comprise, for example, standoffs or centralizers with low heat conductivity disposed between the inner pipe and the outer pipe. The nested pipe string may comprise in addition or substitution various forms of coating and/or insulation within the outer pipe and outside the inner pipe to minimize heat loss by radiation, conduction and/or convection.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A method for drilling and completion of a well and extracting geothermal energy from the well, comprising:
    drilling the well at least partially using a nested drill string, the nested drill string including an inner pipe nested in an outer pipe, a flow crossover disposed at an end of the nested drill string and a drill bit disposed to one side of the flow crossover, wherein drilling fluid is pumped into the well through a first annular space between the inner pipe and the outer pipe, and drill cuttings created by the drill bit are returned to surface through the inner pipe, wherein a second annular space between the outer pipe and the well is open to fluid flow from surface to a bottom of the nested drill string;
    either (i) displacing fluid in the first annular space with a lower conductivity fluid or (ii) evacuating the annular space; and
    extracting geothermal heat from a subsurface formation to the surface by pumping fluid down the second annular space and returning heated fluid through the inner pipe.

2. The method of claim 1 further comprising filling the second annular space between the well and an exterior of the nested drill string with a fluid having a higher density than the drilling fluid during drilling the well.

3. The method of claim 1 wherein at least part of the well is substantially horizontal.

4. A method for drilling and completion of a well and extracting geothermal energy from the well, comprising:
drilling the well at least partially using a nested drill string, the nested drill string including an inner pipe nested in an outer pipe, a flow crossover disposed at an end of the nested drill string and a drill bit disposed to one side of the flow crossover, wherein drilling fluid is pumped into the well through a first annular space between the inner pipe and the outer pipe, and drill cuttings created by the drill bit are returned to surface through the inner pipe;
removing the nested drill string from the well;
inserting a nested completion pipe string into the well, the nested completion pipe string comprising an inner pipe nested within an outer pipe to provide a first annular space therebetween and a second annular space between the outer pipe and the well, wherein the inner pipe and the outer pipe are inserted simultaneously;
either (i) placing a low thermal conductivity fluid in the first annular space of the nested completion pipe string or (ii) evacuating the first annular space of the nested completion pipe string; and
geothermally heating fluid by pumping fluid into the well through the second annular space of the nested completion pipe string and returning the pumped fluid through an interior of the inner pipe of the nested completion pipe string.

5. The method of claim 4 wherein at least part of the well is substantially horizontal.

6. A method for completion of a pre-drilled well and extracting geothermal energy from the well, comprising:
inserting a nested pipe string into the well, the nested pipe string comprising an inner pipe inserted into an outer pipe to provide a first annular space therebetween and a second annular space between the outer pipe and the well, wherein the first annular space is substantially continuous along an entire length of the nested pipe string, wherein the outer pipe and the inner pipe are inserted into the well simultaneously, wherein the second annular space is open to fluid flow from surface to a bottom of the nested pipe string;
after inserting the nested pipe string, either (i) placing a low thermal conductivity fluid in the first annular space or (ii) evacuating the first annular space; and
geothermally heating fluid by pumping fluid into the well through the second annular space to transfer heat from formations outside the second annular space to the pumped fluid in the second annular space as the fluid moves through the second annular space and returning the pumped fluid through an interior of the inner pipe.

7. The method of claim 6 wherein at least part of the well is substantially horizontal.

8. The method of claim 6 wherein the nested pipe string comprises at least one of a thermal radiation barrier, a thermal convection barrier and a thermal conduction barrier in the first annular space.

9. The method of claim 6 further comprising installing a permeability barrier in an uncased part of the well.

10. The method of claim 9 wherein the permeability barrier comprises at least one of a casing, a chemical coating and a particle coating.

11. The method of claim 6 wherein the well is drilled using the nested pipe string.

12. The method of claim 6 wherein at least one of the inner pipe and the outer pipe comprises segments coupled end to end.

13. The method of claim 6 wherein the first annular space is substantially hydraulically continuous along the entire length of the nested pipe string.

14. The method of claim 6 wherein the geothermal heating comprises transferring heat from formations outside the second annular space to the pumped fluid moving along the second annular space.

15. A method for drilling and completion of a well and extracting geothermal energy from the well, comprising:
drilling the well at least partially using a nested drill string, the nested drill string including an inner pipe nested in an outer pipe, a flow crossover disposed at an end of the nested drill string and a drill bit disposed on one longitudinal side of the flow crossover, wherein drilling fluid is pumped into the well through a first annular space between the inner pipe and the outer pipe, and drilling fluid comprising drill cuttings created by the drill bit is returned to surface through the inner pipe, the drilling including filling the second annular space between the well and an exterior of the nested drill string with a fluid having a higher density than the drilling fluid during drilling the well;
either (i) displacing fluid in the first annular space with a lower conductivity fluid or (ii) evacuating the annular space; and
extracting geothermal heat from a subsurface formation to the surface by pumping fluid down a second annular space-between the well and an exterior of the nested drill string and returning heated fluid through the inner pipe.

16. The method of claim 15 wherein at least part of the well is substantially horizontal.

* * * * *